(No Model.)
E. HAYS.
VEHICLE BRAKE.
No. 513,394. Patented Jan. 23, 1894.
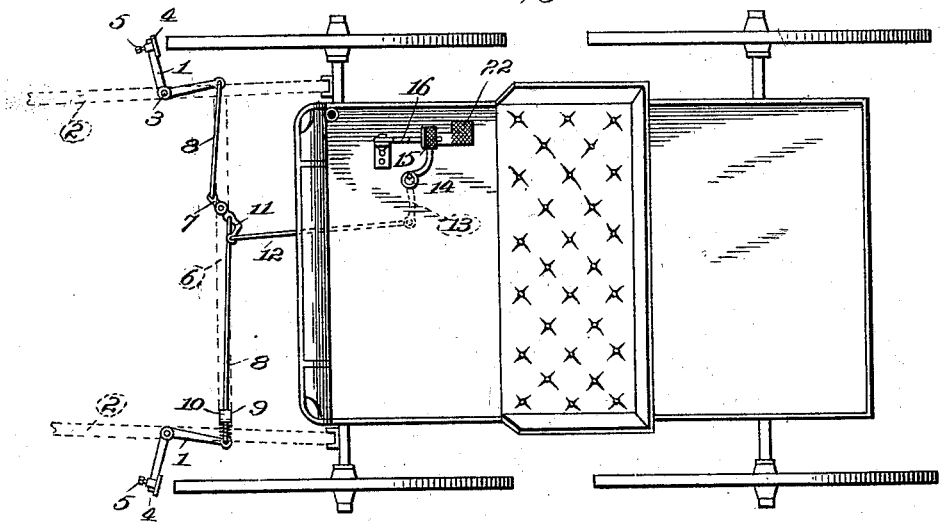
Fig. 1.
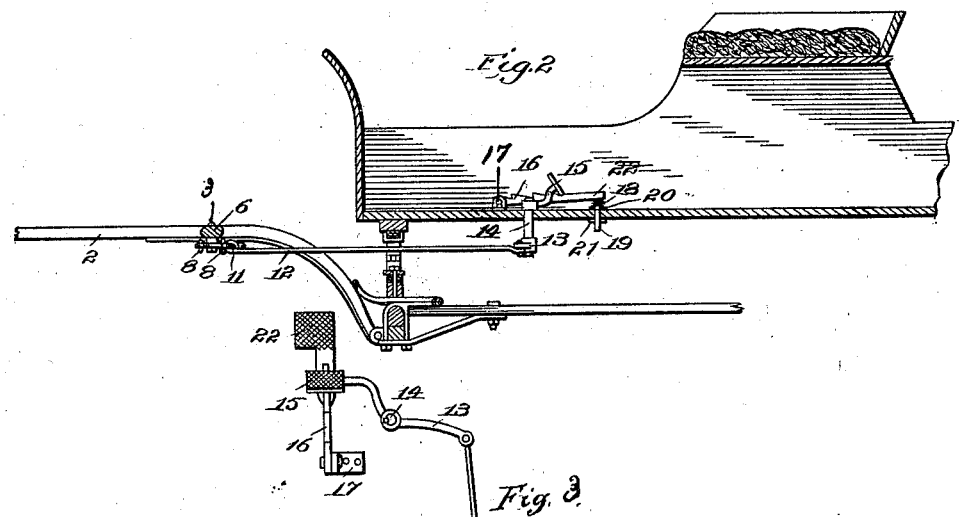
Fig. 2.
Fig. 3.
Witnesses:
Harry S. Rhu.
Walter E. Allen.
Inventor:
Elijah Hays.
By Knight Bros.
Attys.

UNITED STATES PATENT OFFICE.

ELIJAH HAYS, OF WARSAW, INDIANA.

VEHICLE-BRAKE.

SPECIFICATION forming part of Letters Patent No. 513,394, dated January 23, 1894.

Application filed May 13, 1893. Serial No. 474,092. (No model.)

*To all whom it may concern:*

Be it known that I, ELIJAH HAYS, a citizen of the United States, residing at Warsaw, in the county of Kosciusko and State of Indiana, have invented certain new and useful Improvements in Vehicle-Brakes, of which the following specification, taken in connection with the accompanying drawings, is a full, clear, and exact description.

My invention relates to an improved form of brake which can be conveniently applied to light vehicles by attaching the brake levers to the thills in proper position for braking the front wheels, the brake levers being connected through suitable rods and levers with a foot lever in the vehicle.

My invention consists first, in a simple construction and arrangement of levers for operating the brakes; and second, in improved means for holding the brakes in applied position for supporting the thills in elevated position and preventing them being broken.

In order that my invention may be fully understood, I will first describe the same with reference to the accompanying drawings, and afterward particularly point out the novel features in the annexed claims.

In the said drawings:—Figure is a plan view of a vehicle having my improved brake applied thereto, parts being broken away for the purpose of more clearly showing the structure. Fig. 2 is a detail sectional view. Fig. 3 is a detail plan representation of the parts detached from the vehicle.

1—1 are the bell-crank brake levers which are pivotally attached at their elbows to the under side of the thills 2 by means of pivot bolts 3.

4 are the brake-blocks secured to the outer ends of the brake levers by means of suitable bolts 5.

Pivotally attached to the under side of the cross-bar 6 is a double-armed operating lever 7, which is attached to the operating arms of bell-crank brake levers 1 by the rods 8 which are pivoted upon each side of its center.

9 is a perforated ear or lug secured to the cross-bar 6 adjacent to one end, through which one of the connecting rods 8 passes.

10 is a spiral spring confined between the ear or lug 9 and the end of one of the brake levers for holding the brake-levers in unapplied position.

Attached to the arm 11 of the lever 7 is a rod 12, which extends under the vehicle body and is pivotally attached to a crank-arm 13 keyed to the end of a rock-shaft 14 which is journaled in the vehicle bottom.

15 is a pedal or foot lever keyed to the upper end of the rock shaft and extending to one side in convenient position to be operated by the foot of the driver. By pushing the foot lever forward the rock shaft 14 is rotated so as to move the crank arm 13 backward and rotate the lever 7 on its center, which will in turn lock the bell-crank levers on their centers and apply the brakes to the wheels.

It is very often desirable to secure the brakes in applied position, when for instance, it is desired to support the thills in elevated position after the horse is detached. For this purpose I provide a rack-bar 16 pivoted at its forward end to the perforated lug 17 which is secured to the wagon body by screws or other suitable means. The teeth of the rack-bar 16 are adapted to engage the edge of the foot lever 15 when it is moved forward to hold it in any desired position. In order to support the rack-bar so that it will be constantly in contact with the edge of the foot-lever, I provide a spiral spring 18 surrounding a depending rod 19 secured to the rear end of the rack-bar and engaging the washer 20 which surrounds an opening 21 in the bottom of the vehicle. It will be seen that the spiral spring is confined between the washer 20 and the rack bar 16 so that the rear end of the rack bar will be constantly forced upward to keep the teeth of the rack bar into engagement with the foot lever. For convenience in depressing the rack-bar against the action of the spring, I form an enlargement or presser-foot 22 on its rear end. When the presser foot is pushed down by the movement of the foot of the rider, the depending rod 19 passes through the perforation 21 in the vehicle body and the spring 18 is compressed.

In operating the device for applying the brakes, the foot lever is pressed forward until the brakes are sufficiently applied, the supporting spring of the rack bar giving sufficiently to allow the foot lever to pass the teeth of the rack bar. When it has been pressed forward sufficiently the rack bar will hold it in place. When it is desired to release the brakes, the presser-foot 22 is depressed and the spiral spring 10 forces the brake levers into released position, which will of course return the foot lever to its normal position.

Having thus described my invention, the following is what I claim as new therein and desire to secure by Letters Patent:

1. In a vehicle brake, the combination of the thills, the bell-crank levers pivotally attached to the thills, the brake-blocks carried by the bell-crank levers and adapted to be brought into contact with the wheels, a double-arm operating lever pivoted to the cross-bar of the thills, suitable connections between the arms of the operating levers and the bell-crank levers, means for operating said lever, and means for holding the brakes in unapplied position, substantially as set forth.

2. In a vehicle brake the combination of the thills, the bell-crank levers pivotally attached to the thills and carrying the brake blocks, a double-arm operating lever pivoted to the cross-bar of the thills, rods connecting the arms of the operating lever with the bell-cranks, a spring surrounding one of the connecting rods and engaging one of the bell-cranks, a stop on the cross-bar engaging the opposite end of the spring, and suitable means for operating the lever for applying the brake in opposition to the action of the spring, substantially as set forth.

3. In a vehicle brake, the combination of the thills, the bell-crank levers pivotally attached to the thills and carrying the brake-blocks, an operating lever suitably connected to the bell-crank levers, a rock-shaft or axle journaled in the vehicle bottom and suitably connected with the operating lever, a pedal or foot-lever keyed to the rock-shaft inside of the vehicle, a pivotally supported rack-bar with which the foot-lever engages, and a spring for holding the rack-bar in engagement with the foot-lever, substantially as set forth.

4. In a vehicle brake, the combination of the brake-levers, the rock-shaft journaled in the vehicle bottom, and suitably connected with the brake levers, the foot-lever keyed to the upper end of the rock shaft, the rack-bar pivotally supported at its forward end and adapted to engage the foot lever for holding it in the desired position, the presser-foot on the rear end of the rack-bar, and a suitable spring under the presser-foot for keeping the rack-bar in its upper position, substantially as set forth.

ELIJAH HAYS.

Witnesses:
A. G. WOOD,
F. E. BOWSER.